UNITED STATES PATENT OFFICE.

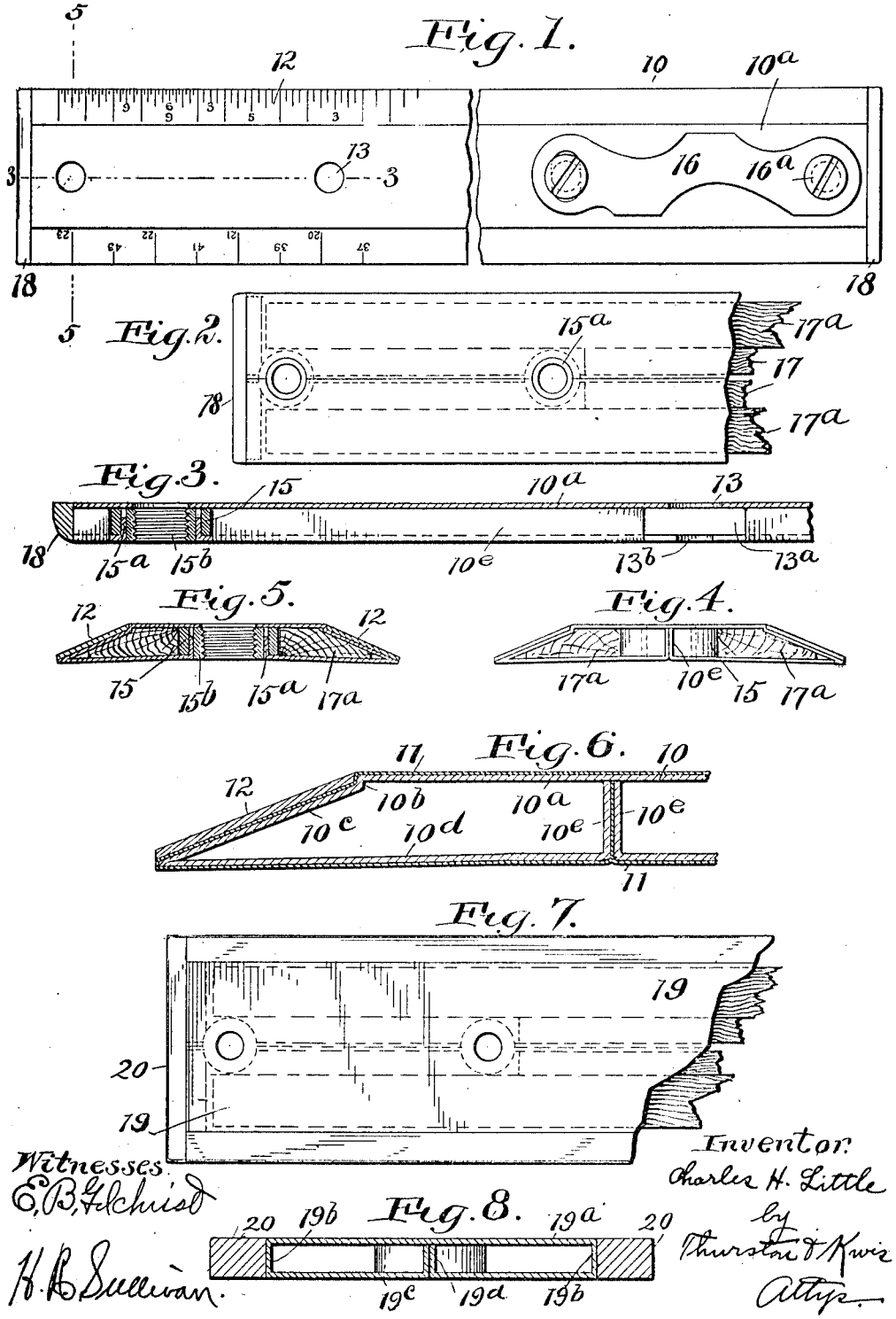

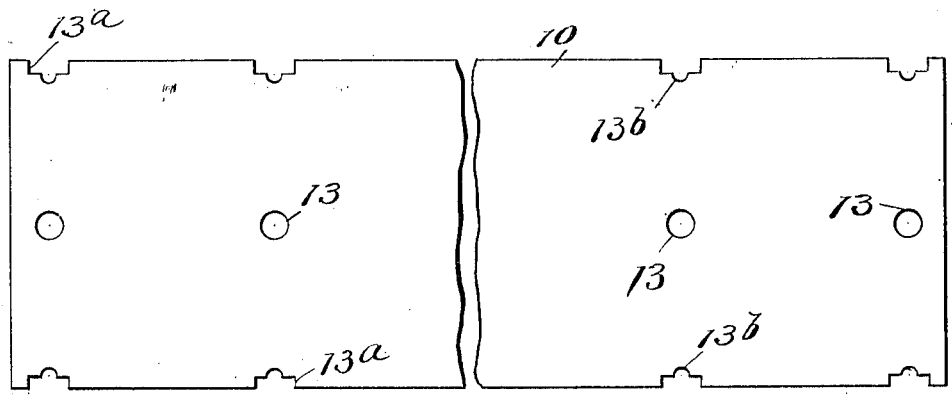

CHARLES H. LITTLE, OF EAST CLEVELAND, OHIO.

RULER.

1,274,291. Specification of Letters Patent. Patented July 30, 1918.

Application filed October 5, 1911. Serial No. 652,918.

*To all whom it may concern:*

Be it known that I, CHARLES H. LITTLE, a citizen of the United States, residing at East Cleveland, in the county of Cuyahoga and State of Ohio, have invented a certain new and useful Improvement in Rulers, of which the following is a full, clear, and exact description.

This invention relates to rulers, such as scales, straight edges, T squares, etc., and has for its object to provide rulers which shall possess all or at least most of the advantages, and none, or the least possible number of the disadvantages of both wooden and metal rulers, as at present used.

More specifically, the invention aims to provide a ruler which has really straight edges that will remain straight and not warp or get out of shape and one that shall be light in weight, have edges finished without machining, one that shall have parallel edges, and one that shall have sufficient stiffness and rigidity to meet the requirements of general use.

At the present time wooden rulers are employed by draftsmen and engineers almost universally, in spite of the fact that they have a marked tendency to warp out of shape, and metal rulers are employed to some extent, despite the fact that they are difficult to read when used continuously, and in a number of ways have not proven entirely satisfactory.

In carrying out my invention, I form the ruler or body of the ruler of metal, which preferably consists of a very thin strip of sheet metal in order that the ruler shall possess the desired lightness of weight and in order that it may be provided when formed into shape with smooth thin edges which are straight and parallel. By a novel bending process, the strip is formed into a hollow body having pressed or folded finished edges, the particular shape and construction of this ruler constituting one of the important parts of the invention.

Further parts of the invention reside in the finished ruler which preferably includes, in addition to the metal body above referred to, celluloid or other strips which I am enabled, by reason of an important discovery to cement to the body for various purposes, chief of which are to provide transparent or translucent edges for the straight edge; and in the case of the scale to apply the necessary graduations and characters, in easily readable form.

Additionally, the invention resides in certain features of construction and combination of certain elements with the ruler body, which increases its strength and rigidity and adapts the tool for use with a tool holding and operating member, such as the universal drafting machine.

The invention may be further briefly summarized as consisting in certain novel details of construction and combinations and arrangements of parts which will be described in the specification and set forth in the appended claims.

In the drawings, I have shown both a scale and a straight-edge constructed in accordance with the preferred form of my invention, both the rulers being constructed to receive chuck plates so as to adapt them for use in a drafting machine, although I wish it to be understood that the tools need not be provided with chuck plates, as they are as well adapted for ordinary hand use as for drafting machine use.

In the drawings, Figure 1 is a top view of a portion of the scale; Fig. 2 is a bottom view of a portion of the same; Fig. 3 is an enlarged partial longitudinal sectional view of the scale partially completed, the section being taken along the line 3—3 of Fig. 1; Fig. 4 is an end view of the same on a slightly enlarged scale, with the end closure of the scale removed; Fig. 5 is a slightly enlarged transverse sectional view substantially along the line 5—5 of Fig. 1; Fig. 6 is a partial enlarged transverse sectional view of the scale body showing the thickness of the parts exaggerated; Fig. 7 is a top plan view of a portion of a straight edge constructed in accordance with my invention; Fig. 8 is a sectional view of the same slightly enlarged; and Fig. 9 is a plan view of a portion of the strip from which the ruler body is formed.

Referring first to Figs. 1 to 6, of the drawings, it will be seen that the scale comprises a hollow sheet metal body 10, which I form from a single piece of metal. In practice, I form the scale from a strip of sheet steel very thin—in fact, much thinner than is indicated in the drawings, in order that the scale may have the proper degree of lightness of weight and in order that it may be formed in the desired shape by a bending process, and will possess the required accuracy and smoothness at the edges, and will also be thin at the edges so that the draftsman is enabled to work to a thin edge.

The scale body has a flat top portion $10^a$ which is slightly offset leaving shoulders $10^b$ at its edges. From these shoulders the top is beveled or inclined downwardly as indicated at $10^c$, the beveled portions extending to the parallel edges of the scale. The bottom of the scale body is formed by bending or folding the lateral portions $10^d$ of the strip inwardly with reference to the intermediate portions $10^a$ and $10^c$, until said lateral portions are substantially in alinement with one another and substantially parallel to the top portion $10^a$. It will be noted, however, that the two portions forming the bottom are not in exact alinement, nor are they exactly parallel to the central top portion $10^a$, for the reason that the bottom is caused to have a slight concavity which is very desirable, in order that the scale will bear on the drafting paper at its edges only, so that the soiling of the paper by the scale will be minimized. The edge portions of the strip shown at $10^e$ are bent upwardly at right angles to the portions $10^d$, and when the latter are folded inwardly or back along the top portions, the edge portions $10^e$ are brought together at the middle of the scale, and constitute an inner central strengthening and bracing rib which extends from one end of the scale to the other, except for certain interruptions to be referred to presently.

The scale body is provided by the bending process alone with finished pressed or folded edges which are straight and parallel, no subsequent finishing or straightening process in the way of machining being required. Indeed by my process I am enabled to obtain without subsequent machining far more accurate rulers than I believe possible by a machining process with such thin material. It should be noted that at the edges, the angles are very acute and the scale body along the edges is exceedingly thin, as is desirable for accurate work, the thickness being no more than twice the thickness of the metal. It should be noted also that the edges of the body are smooth and rounded, and therefore will have no tendency to catch in drafting paper or to cut and mar the same when the scale is in use, and the edges of the metal itself are away from the outer surface of the body.

To enhance the stiffening and strengthening action of the central bracing rib, I provide the scale body at several points in its length with a fastening means which mechanically unites or fastens together the parts of the scale body in a very effective manner. This feature will next be explained and described.

When the strip from which the scale body is formed is blanked out, a number of circular openings are punched in the center line of the strip, and along the edges opposite these openings, notches are formed, each of a depth equal to the height of the flanges forming the central bracing rib, and of a length equal to the external diameter of a bushing to be referred to presently. Each of these notches has at the bottom a semi-circular notch or recess. Consequently, when the scale body is formed into the shape described, there are provided along the top, openings 13; in the rib below said openings notched out portions or openings $13^a$; and in the bottom, openings $13^b$ which are directly below and concentric with the upper openings but smaller than the latter. At the right hand end of Fig. 3 and in Fig. 9 I have shown the locations and relative sizes of each set of the openings and notch.

To fasten the parts together, as referred to above, I utilize bushings 15, each of which is inserted in one of the notches $13^a$, between the top and bottom walls of the scale body concentrically with respect to the two openings 13 and $13^b$, the length of the notch being substantially equal to the outside diameter of the bushing. Thence the parts of the lower side of the scale body which are on opposite sides of the dividing line of the rib and which overhang the inner lower edge of the bushing are bent by a suitable tool inwardly along the inner surface of the bushing, so as to form a rigid tubular support $15^a$ for the latter. This forms at intervals along the length of the scale body and between the top and bottom walls an internal support which is fastened to both parts $10^d$ of the bottom wall by means constituting in effect a rivet. I then insert within the bushing 15 and within the tubular upturned support $15^a$ a plug $15^b$ which is driven in place with a tight fit and firmly binds together the upturned portion of the bottom wall and the bushing 15. Preferably, this plug is in the form of a threaded bushing, for a reason to be referred to presently, which bushing as shown is flush with the bottom wall of the scale body and has its top edge bearing against the underside of the top wall of the scale body about the upper opening 13, which is, of course, concentric with the inner bushing.

I prefer to employ threaded bushings $15^b$ in the fastening means above described for the reason that I am thereby enabled to attach to the scale chuck plates 16 which adapt the scale for use in a drafting machine, the construction above described constituting a very effective anchorage for the chuck plate screws $16^a$. To adapt a scale or other ruler for use in the drafting machine, it is usually provided with either one or two chuck plates, each secured to the ruler near one end by means of two screws. Although the attachment of the chuck plates or other pieces to the wooden scales or straight edges is a simple matter, such is obviously not the case with my improved metal rulers in view of the difficulty in securing good anchorage for the screws.

However, by properly spacing the fastening devices above referred to and by utilizing as a part thereof the threaded bushings $15^b$, the latter may be employed as anchorage for the chuck plate or other screws, and I am thus enabled to secure the chuck plates to the ruler in a very effective manner.

After the scale body is formed into the hollow shape described, its outer surface is provided with a coating consisting preferably of an enamel which is caused to adhere to the metal surface by the usual baking process, this coating being shown in exaggerated thickness at 11 in Fig. 6. This coating of enamel has in this case two very important special functions in addition to its usual functions of affording protection to the metal, and of improving its appearance.

In the first place the enamel coating cements together very effectively the two upwardly extending flange-like members $10^e$ so as to form a single unitary bracing rib. This cementing action has the effect of increasing to a remarkable extent, the rigidity and stiffness of the scale.

An additional special advantage or function of the enamel coating is that it enables me to cement to the metal scale body, strips 12 which may be of celluloid, hard thin strip metal, or other material bearing the graduations and necessary descriptive characters required in the use of the scale. Although it is common practice to cement celluloid strips to wooden scales, celluloid in the form of strips could never be applied to metal, for the reason that there has never been known, so far as I am aware, a process of cementing them or causing them to adhere to the metal surface. By the use of the intermediate coating, the strips may be permanently and very effectively cemented to the scale body by cementing the strips directly onto the coating (instead of onto the metal) by any suitable cement and by the usual simple cementing process. Inasmuch as the strip is cemented to the scale body at all points of its length, it retains its original length and is unable to shrink lengthwise, the adhesion between the baked coating and metal and between the coating and strip being sufficient to effectively resist the stresses due to the shrinkage of the strip which in the case of celluloid are enormous. The strips 12 are, as shown in the drawings, cemented to the inclined or beveled edge portion $10^e$ and extend from the shoulders $10^b$ to the adjacent thin edges of the scale body.

To further strengthen and stiffen the scale body and especially to eliminate danger of the scale body being indented or crushed by pressure applied on it, I prefer to place in the scale body inserts of wood or other material light in weight. In the present case, I employ for each scale four separate inserts, two (shown at 17) being located on opposite sides of the central bracing rib between the two innermost sets of bushings 15, and the other two, (shown at $17^a$) extending nearly the full length of the scale and extending beneath the inclined or beveled portions, as shown. These inserts preferably are not fastened to the scale body and the ends are so located with respect to other parts of the scale that said inserts are free to "come and go." To protect the ends of the scale body, I prefer to insert end pieces in the form of plugs 18 which may project outwardly a short distance beyond the ends of the scale body and are preferably rounded, on the lower side, as shown most clearly in Fig. 3. The ends of the strips 12 are preferably cemented to the plugs 18 so as to prevent the strips being loosened at the ends.

In Figs. 7 and 8 I have shown a straight edge constructed in accordance with the present invention, the straight edge being formed by a process somewhat similar to that employed in the formation of the scale and possessing many of the structural characteristics of the latter. The body 19 of the straight edge is formed from a thin strip of sheet metal into the hollow form shown in Fig. 8, the shape of the straight edge body differing from that of the scale body in the respect that the beveled edge portions of the latter are not here employed. The body 19 is provided with a flat continuous top portion $19^a$, edge portion $19^b$ of which are formed by bending the metal at right angles to the top portion $19^a$, and a bottom portion $19^c$, which is formed by bending the lateral portions of the strip back along the top portion to the center line of the body or until said portions are in substantial alinement with one another and substantially parallel to the top portion $19^a$, the concavity on the lower side being provided as in the scale body. The edge portions $19^d$ of the strip are as in the first instance bent upwardly into the body forming a central inner bracing rib extending lengthwise of the body. In the process of forming the straight edge body, its pressed edges are made absolutely straight and parallel from one end of the body to the other by the use of accurate dies and mandrels having accurately formed straight and parallel sides and edges.

After the formation of the straight edge body, the latter is coated with enamel, which cements together the flange portions 19ᵈ forming the bracing rib. Also by reason of this coating, I am enabled to cement to the edges 19ᵇ of the body transparent or translucent strips 20 which are preferably formed of celluloid. These may of course be omitted, if desired.

The construction of the straight edge body enables me to employ the same form of fastening means to stiffen and strengthen the body, which fastening means may serve as an anchorage for the chuck plate screws, as is employed with the scale, and as described in detail above, this fastening means and anchorage including two concentric bushings similar to the bushings 15 and 15ᵃ which are held together and united to the body by the same means as previously described. The straight edge body may be provided also with the wooden inserts and the protecting plug at the ends.

I wish it to be understood that I use the word "ruler" in the specification and claims not in a limited sense, but in a broad sense, meaning any instrument having straight edges by which straight lines of predetermined or indefinite lengths may be drawn. Furthermore, while I have illustrated and specifically described only two types of rulers, I do not desire my invention in many of its aspects to be confined to such described forms only.

Having thus described my invention, what I claim is:

1. A ruler comprising a hollow body formed from a strip of thin sheet metal and having a top portion which is beveled or inclined downwardly to both edges, and a bottom portion formed by bending lateral portions of the strip inwardly at an acute angle to the beveled portions, thereby providing finished parallel ruling edges.

2. A ruler comprising a hollow body having straight parallel opposite edges and formed from a single strip of thin sheet metal, the middle portion of the strip forming the top of the body, the lateral portions being bent back along the middle portion and forming the bottom of the body and the edges being bent upwardly and extending from the bottom to the top so as to constitute an inner central strengthening rib which extends lengthwise of the body.

3. A ruler comprising a hollow body having straight parallel opposite edges and formed from a strip of thin sheet metal, the lateral portions of the strip forming the bottom of the body and being bent back along an intermediate portion which forms the top, and the edge portions being bent upwardly side by side at substantially right angles to said lateral portions, thereby forming a central internal bracing rib.

4. A closed tubular pressed sheet metal ruler having the edge portions of the metal upon the interior of the ruler and away from the outer surface of the ruler and held together against spreading.

5. A ruler comprising a hollow body formed from a strip of thin sheet metal, the lateral portions of the strip being folded back along an intermediate portion, thereby forming ruling edges, and the edge portions of the strip being bent inwardly side by side and being fastened together thereby forming an inner longitudinally extending bracing rib.

6. A ruler comprising a hollow body having straight parallel opposite edges and formed from a single strip of thin sheet metal, the lateral portions of the strip being bent back beneath an intermediate portion to the center plane of the body and the edge portions being bent upwardly to said intermediate portion thereby forming an inner central bracing rib, the two parts of the rib being fastened together to stiffen and add rigidity to the body.

7. A ruler comprising a hollow body having straight parallel opposite edges and formed from a single strip of thin sheet metal, the lateral portions of the strip being bent back beneath an intermediate portion of the strip to the center plane of the body and the edge portions being bent upwardly to said intermediate portion thereby forming an inner central bracing rib, the body being coated with a substance which cements together the two parts of the rib.

8. A ruler comprising a metal body provided with a coating adhering thereto and with a strip cemented to the coating.

9. A ruler comprising a metal body provided with a baked coating and with a strip cemented thereto.

10. A ruler comprising a metal body provided with a coating adhering thereto and with a celluloid strip cemented to the coating.

11. A ruler comprising a metal body provided with a coating adhering thereto and with a strip bearing graduations cemented to the coating.

12. A ruler comprising a metal body having a beveled portion extending to the edge of said body, said portion having a coating adhering thereto and a strip bearing graduations cemented to the coating.

13. A ruler comprising a metal body having a beveled edge portion provided with a coating and a celluloid strip bearing graduations cemented thereto.

14. A ruler comprising a hollow body formed from a strip of thin sheet metal and having a substantially flat top portion which is beveled or inclined downwardly to both edges, and a bottom portion formed by bending the lateral portions of the strip inwardly at an acute angle to the beveled portions.

15. A ruler comprising a hollow body formed from a strip of thin sheet metal and having a substantially flat top portion which is beveled or inclined downwardly to both edges, and a bottom portion formed by bending lateral portions of the strip inwardly at an acute angle to the beveled portions, said beveled portions carrying a strongly adhering medium bearing graduations.

16. A ruler comprising a hollow body formed from a strip of thin sheet metal and provided with a top portion, consisting of a substantially flat middle portion and beveled or inclined portions extending therefrom to the edges of the body, the middle portion being offset from the beveled portions forming shoulders, and a bottom formed by bending the lateral portions of the strip inwardly at acute angles to the beveled portions, said beveled portions bearing a graduated medium.

17. A ruler comprising a hollow body formed from a metal strip and having top and bottom walls, one of said walls being formed by bending lateral portions of the strip inwardly toward each other and along an intermediate portion constituting the other wall, and a member within the hollow body and mechanically fastening said portions.

18. A ruler comprising a hollow body having top and bottom walls and formed from sheet metal, a bushing within the body between said walls, and portions of the body bent therein.

19. A ruler comprising a hollow body formed from sheet metal and provided with top and bottom walls, a bushing between said walls, portions of one of the walls being bent into the bushing, and a plug driven into said bent portions.

20. A ruler comprising a hollow body formed from sheet metal and provided with top and bottom walls, a bushing between said walls having portions of one of the walls bent therein and a threaded bushing forced into said bent portions.

21. A ruler comprising a hollow body having top and bottom walls, and an internal central bracing rib having an opening, a bushing inserted in said opening and having portions of one of the walls bent into the same, and an inner member forced into said inwardly bent portions.

22. A closed tubular pressed sheet metal ruler having the edges of the metal on the interior of the ruler away from the outer surface of the ruler.

23. A ruler comprising a metal body having a coating and a strip of celluloid cemented to the coating, the adhesion between the coating and metal being sufficient to effectively resist the stresses due to the shrinkage of the celluloid.

24. A ruler comprising a metal body having a protective coating and a strip adhering to said coating.

25. A ruler comprising a tubular body formed from a strip of sheet metal and having a substantially flat top portion, a portion which is beveled or inclined downwardly and outwardly therefrom to an edge, such portion being formed from the part of the strip which is contiguous to the part forming the flat top portion of the ruler body, and a bottom portion formed by bending the strip inwardly at an acute angle to the beveled portion, thereby providing a finished folded ruling edge.

26. A ruler having along its edge a non-metallic surface in which graduations may be cut and having a metal body which holds the surface in shape, and to which substantially all portions of the surface strongly adhere.

27. A ruler comprising a tubular metal body having a strip of celluloid adhering thereto.

28. A ruler comprising a closed tubular body formed from a strip of sheet metal and having top and bottom walls, and an integral inner bracing rib formed by the edge portions of the strip.

In testimony whereof, I hereunto affix my signature in the presence of two witnesses.

CHARLES H. LITTLE.

Witnesses:
H. R. SULLIVAN,
A. F. KWIS.